(12) United States Patent
Shi et al.

(10) Patent No.: US 8,194,520 B2
(45) Date of Patent: Jun. 5, 2012

(54) DISC STRUCTURE FOR BIT-WISE HOLOGRAPHIC STORAGE

(75) Inventors: Xiaolei Shi, Niskayuna, NY (US); Brian Lee Lawrence, Niskayuna, NY (US); Eugene Pauling Boden, Scotia, NY (US); Zhiyuan Ren, Malta, NY (US); Mark Cheverton, Mechanicville, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 623 days.

(21) Appl. No.: 12/346,378

(22) Filed: Dec. 30, 2008

(65) Prior Publication Data

US 2010/0165817 A1 Jul. 1, 2010

(51) Int. Cl.
G11B 7/0065 (2006.01)

(52) U.S. Cl. .......................................... 369/103

(58) Field of Classification Search ............... 369/44.27, 369/103, 112.29, 44.32, 44.38, 273
See application file for complete search history.

(56) References Cited

U.S. PATENT DOCUMENTS

| | | | |
|---|---|---|---|
| 5,450,218 A | 9/1995 | Heanue et al. | |
| 5,510,912 A | 4/1996 | Blaum et al. | |
| 5,511,060 A * | 4/1996 | Jau-Jiu et al. | 369/118 |
| 5,727,226 A | 3/1998 | Blaum et al. | |
| 5,808,998 A | 9/1998 | Curtis et al. | |
| 6,175,317 B1 | 1/2001 | Ordentlich et al. | |
| 6,549,664 B1 | 4/2003 | Daiber et al. | |
| 6,563,779 B1 | 5/2003 | McDonald et al. | |
| 6,711,711 B2 | 3/2004 | Hwang | |
| 6,738,322 B2 | 5/2004 | Amble et al. | |
| 6,889,907 B2 | 5/2005 | Roh | |
| 7,020,054 B2 | 3/2006 | Kadlec et al. | |
| 7,388,695 B2 | 6/2008 | Lawrence et al. | |
| 7,916,585 B2 * | 3/2011 | Saito | 369/44.27 |
| 2002/0041561 A1 * | 4/2002 | Tsukamoto et al. | 369/103 |
| 2003/0179687 A1 * | 9/2003 | Schoeppel et al. | 369/273 |
| 2004/0081033 A1 * | 4/2004 | Arieli et al. | 369/18 |
| 2005/0002311 A1 * | 1/2005 | Ichihara et al. | 369/103 |
| 2005/0136333 A1 | 6/2005 | Lawrence et al. | |
| 2005/0286386 A1 * | 12/2005 | Edwards et al. | 369/103 |
| 2006/0073392 A1 | 4/2006 | Erben et al. | |
| 2006/0078802 A1 | 4/2006 | Chan et al. | |
| 2006/0227398 A1 | 10/2006 | Lawrence et al. | |

(Continued)

FOREIGN PATENT DOCUMENTS

EP 2063426 A1 5/2009

(Continued)

OTHER PUBLICATIONS

Freeman, Mark O. et al., Robust Focus and Tracking Detection for Holographic Digital Versatile Disc Optical Pickup-Head Modules, Jpn. J. Appl. Phys. vol. 38 (1999), pp. 1755-1760, Part 1, No. 3B, Mar. 1999.

(Continued)

*Primary Examiner* — Peter Vincent Agustin
(74) *Attorney, Agent, or Firm* — Fletcher Yoder

(57) ABSTRACT

An optical disc for micro-holographic data storage, including: optically-enabled material configured to store holographic data; guide grooves; a first coating disposed on the guide grooves and configured to reflect a tracking beam and to transmit a read or record beam; and a second coating disposed to cover the guide grooves and disposed on the first coating.

23 Claims, 8 Drawing Sheets

U.S. PATENT DOCUMENTS

| | | | |
|---|---|---|---|
| 2007/0007357 A1* | 1/2007 | Dubs | 235/487 |
| 2007/0047037 A1* | 3/2007 | Yoshizawa et al. | 359/3 |
| 2007/0097469 A1 | 5/2007 | Erben et al. | |
| 2007/0146835 A1 | 6/2007 | Erben et al. | |
| 2007/0223348 A1* | 9/2007 | Sasaki | 369/103 |
| 2008/0055686 A1 | 3/2008 | Erben et al. | |
| 2008/0068942 A1 | 3/2008 | Leonard et al. | |
| 2008/0144145 A1 | 6/2008 | Boden et al. | |
| 2008/0144146 A1 | 6/2008 | Boden et al. | |
| 2008/0239924 A1 | 10/2008 | Fujita et al. | |
| 2008/0316555 A1* | 12/2008 | Kaneko et al. | 359/3 |
| 2010/0046338 A1 | 2/2010 | Saito et al. | |
| 2010/0157774 A1* | 6/2010 | Ren et al. | 369/103 |
| 2010/0165817 A1* | 7/2010 | Shi et al. | 369/103 |

FOREIGN PATENT DOCUMENTS

| | | |
|---|---|---|
| WO | 2008032865 A1 | 3/2008 |

OTHER PUBLICATIONS

Steinbuch, Maarten et al., Limits of Implementation: A CD Player Control Case Study, Proceedings of the American Control Conference, Baltimore, Maryland, Jun. 1994, pp. 3209-3213, Article No. FP2—5:00.

U.S. Appl. No. 12/346,279, filed Dec. 30, 2008, Victor Petrovich Ostroverkhov.

U.S. Appl. No. 12/347,178, filed Dec. 31, 2008, Victor Petrovich Ostroverkhov.

U.S. Appl. No. 12/347,211, filed Dec. 31, 2008, Xiaolei Shi et al.

U.S. Appl. No. 12/336,399, filed Dec. 16, 2008, John Erik Hershey et al.

U.S. Appl. No. 12/336,414, filed Dec. 16, 2008, John Anderson Fergus Ross et al.

U.S. Appl. No. 12/336,457, filed Dec. 17, 2008, John Anderson Fergus Ross et al.

U.S. Appl. No. 12/338,828, filed Dec. 18, 2008, John Anderson Fergus Ross et al.

U.S. Appl. No. 12/338,841, filed Dec. 18, 2008, John Anderson Fergus Ross et al.

U.S. Appl. No. 12/342,794, filed Dec. 23, 2008, John Anderson Fergus Ross et al.

U.S. Appl. No. 12/343,204, filed Dec. 23, 2008, Ruediger Kusch.

International Search Report issued in connection with corresponding PCT Application No. PCT/US2009/068341 on Mar. 25, 2010.

* cited by examiner

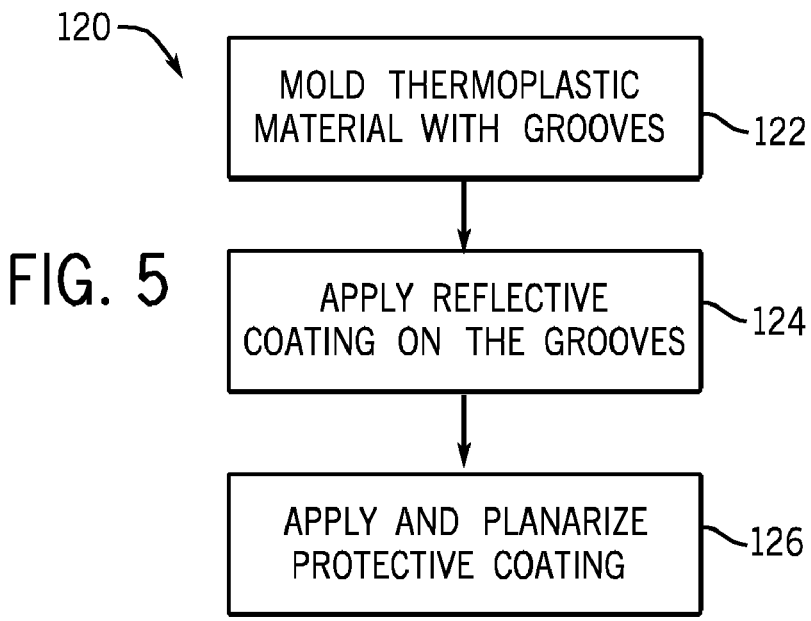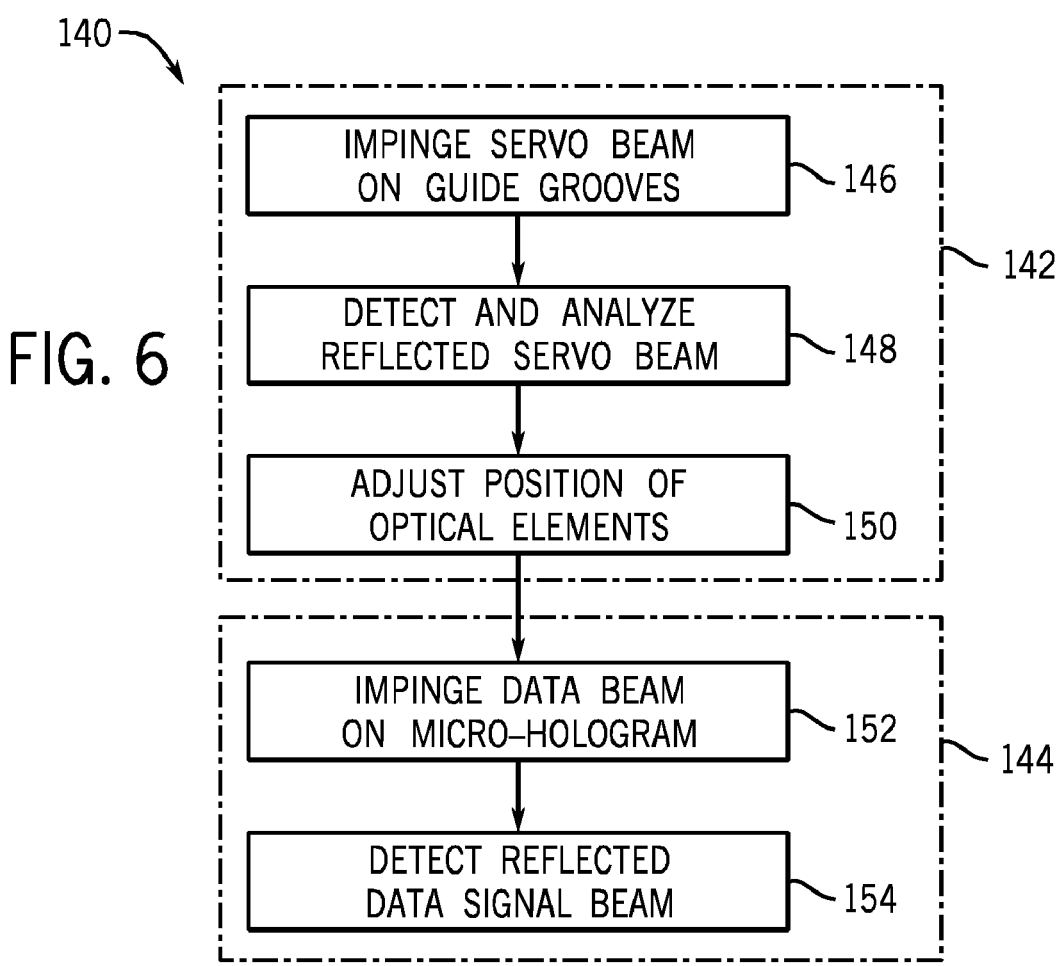

DISC STRUCTURE FOR BIT-WISE HOLOGRAPHIC STORAGE

BACKGROUND

The invention relates generally to bit-wise holographic storage, and more particularly, to a novel holographic disc structure with embedded tracks for real-time recording and readout.

As computing power has advanced, computing technology has entered new application areas, such as consumer video, data archiving, document storage, imaging, and movie production, among others. These applications have provided a continuing push to develop data storage techniques that have increased storage capacity. Further, increases in storage capacity have both enabled and promoted the development of technologies that have gone far beyond the initial expectations of the developers, such as gaming, among others.

The progressively higher storage capacities for optical storage systems provide a good example of the developments in data storage technologies. The compact disc, or CD, format, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). The higher storage capacity of the DVD is sufficient to store full-length feature films at older video resolutions (for example, PAL at about 720 (h)×576 (v) pixels, or NTSC at about 720 (h)×480 (v) pixels).

However, as higher resolution video formats, such as high-definition television (HDTV) (at about 1920 (h)×1080 (v) pixels for 1080 p), have become popular, storage formats capable of holding full-length feature films recorded at these resolutions have become desirable. This has prompted the development of high-capacity recording formats, such as the Blu-ray DiSc™ format, which is capable of holding about 25 GB in a single-layer disc, or 50 GB in a dual-layer disc. As resolution of video displays, and other technologies, continue to develop, storage media with ever-higher capacities will become more important. One developing storage technology that may meet the capacity requirements for some time to come is based on holographic storage.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a data beam which contains digitally encoded data is superposed on a reference beam within the volume of the storage medium resulting in a chemical reaction which, for example, changes or modulates the refractive index of the medium within the volume. This modulation serves to record both the intensity and phase information from the signal. Each bit is therefore generally stored as a part of the interference pattern. The hologram can later be retrieved by exposing the storage medium to the reference beam alone, which interacts with the stored holographic data to generate a reconstructed data beam proportional to the initial data beam used to store the holographic image.

In bit-wise holography or micro-holographic data storage, every bit is written as a micro-hologram, or reflection grating, typically generated by two counter propagating focused recording beams. The data is then retrieved by using a read beam to diffract off the micro-hologram to reconstruct the recording beam. Accordingly, micro-holographic data storage is more similar to current technologies than page-wise holographic storage. However, in contrast to the two layers of data storage that may be used in DVD and Blu-ray Disc™ formats, holographic discs may have 50 or 100 layers of data storage, providing data storage capacities that may be measured in terabytes (TB).

Although holographic storage systems may provide much higher storage capacities than prior optical systems, vibration and wobble of the holographic disc in an optical media player may be larger than a typical micro-hologram size. Consequently, vibration and wobble displacement of the spinning disc may cause problems in recording and readout of the optical disc.

BRIEF DESCRIPTION

An aspect of the invention includes an optical disc for micro-holographic data storage, having: optically-enabled material configured to store holographic data; guide grooves; a first coating disposed on the guide grooves and configured to reflect a tracking beam and to transmit a read or record beam; and a second coating disposed to cover the guide grooves and disposed on the first coating.

An aspect of the invention relates to a method of manufacturing a holographic data storage disc, including: molding a holographic-enabled material in a disc shape with guide grooves; applying a first coating to the guide grooves, wherein the first coating is configured to reflect a tracking beam and to transmit a read or record beam; and applying a second coating to cover the guide grooves, wherein the second coating is dispose on the first coating.

An aspect of the invention includes a multi-layer optical disc for micro-holographic data storage, having: a substrate layer; at least one layer of optically-enabled material; guide grooves; a coating disposed on the guide grooves and configured to reflect a tracking beam and to transmit a read or record beam; and a cover layer.

An aspect of the invention relates to a method of recording, reading, and tracking a holographic data storage disc, including: impinging a record beam on the holographic data storage disc to store or read a micro-hologram in a data region of the holographic data storage disc, wherein a width of the data region is at least 50 micrometers (μm); impinging and reflecting a tracking beam on a guide groove of the holographic data storage disc, wherein the tracking beam comprises a different wavelength than the record beam and read beam; and detecting and analyzing the reflected tracking beam to control a position of the record beam or read beam on the holographic data storage disc.

DRAWINGS

These and other features, aspects, and advantages of the present invention will become better understood when the following detailed description is read with reference to the accompanying drawings in which like characters represent like parts throughout the drawings, wherein:

FIG. 5 is a block diagram of a method of manufacturing the optical disc of FIG. 2;

FIG. 6 is block diagram of a method of recording and/or reading the optical disc of FIG. 2;

DETAILED DESCRIPTION

The present technique relates generally to bit-wise holographic storage, and more particularly, to a holographic disc structure with embedded tracks for real-time recording and readout. For a discussion of various aspects of bit-wise holographic data storage, see U.S. Pat. No. 7,388,695, incorporated herein by reference in its entirety.

Figure 1:
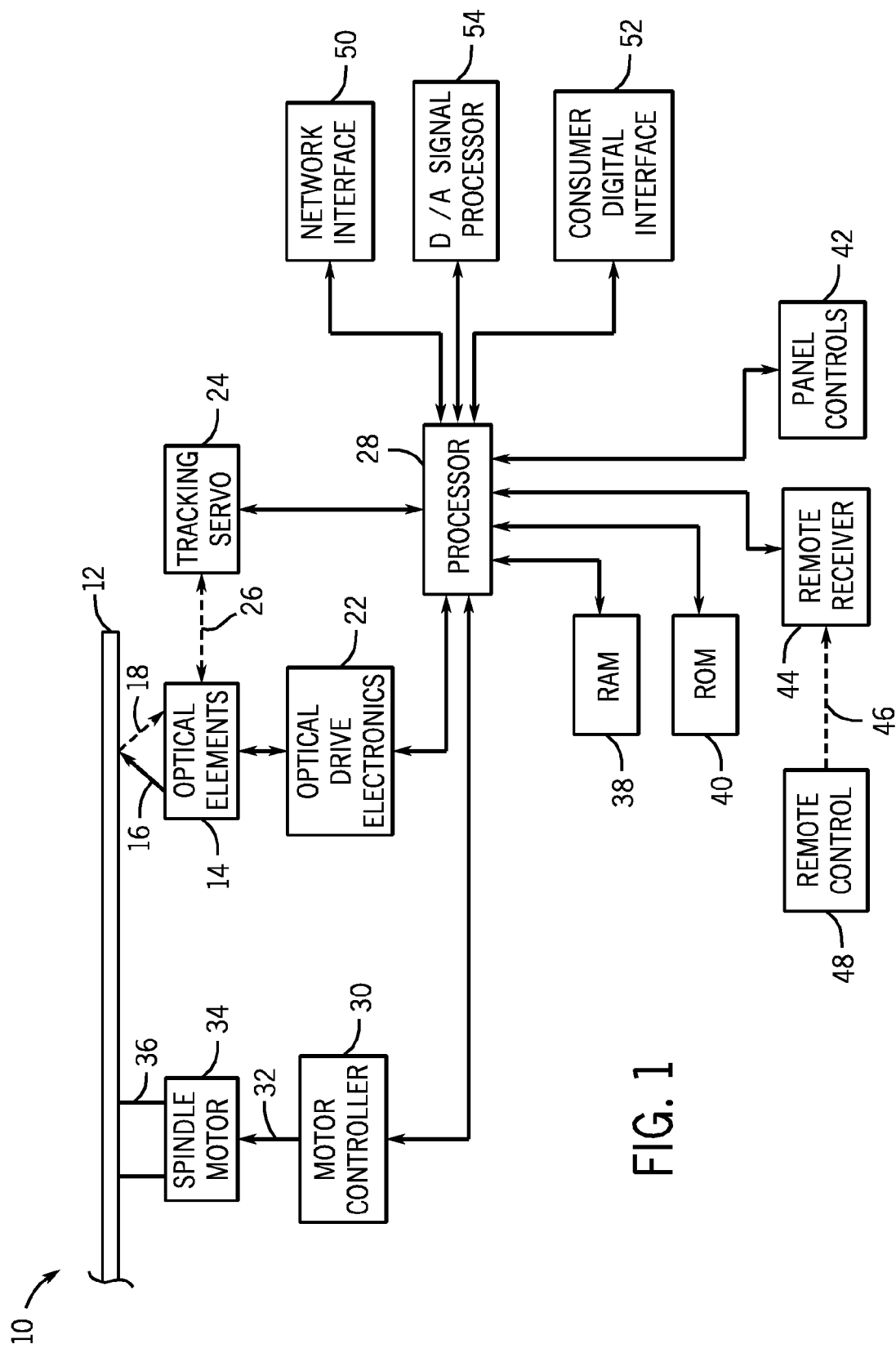
FIG. 1 is a schematic diagram of an optical drive in accordance with embodiments of the present technique.

Turning now to the drawings, FIG. 1 is an optical drive system 10 that may be used to record/read data from optical storage discs 12. The data stored on the optical disc 12 is read by focusing a read beam 16 onto the data in the optical data disc 12. A reflected beam 18 from the data is picked up from the optical data disc 12 by the optical elements 14. The optical elements 14 may comprise any number of different elements designed to generate excitation beams, focus those beams in the optical data disc 12, and detect the reflection 18 coming back from the data in the optical data disc 12. The optical elements 14 are controlled through by an optical drive electronics package 22. The optical drive electronics package 22 may include such units as power supplies for one or more laser systems, detection electronics to detect an electronic signal from the detector, analog-to-digital converters to convert the detected signal into a digital signal, and other units such as a bit predictor to predict when the detector signal is actually registering a bit value stored on the optical data disc 12.

The location of some of the optical elements 14 over the optical data disc 12 is controlled by a tracking servo 24 through a mechanical actuator 26 which is configured to move the optical elements back and forth over the surface of the optical data disc 12. The optical drive electronics 22 and the tracking servo 24 are controlled by a processor 28. In some embodiments, the tracking servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

The processor 28 is connected to random access memory or RAM 38 and read only memory or ROM 40. The ROM 40 contains the programs that allow the processor 28 to control the tracking servo 24, optical drive electronics 22, and motor controller 30. Further, the ROM 40 also contains programs that allow the processor 28 to analyze data from the optical drive electronics 22, which has been stored in the RAM 38, among others. As discussed in further detail herein, such analysis of the data stored in the RAM 38 may include, for example, demodulation, decoding or other functions necessary to convert the information from the optical data disc 12 into a data stream that may be used by other units.

If the optical drive system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

Figure 2:
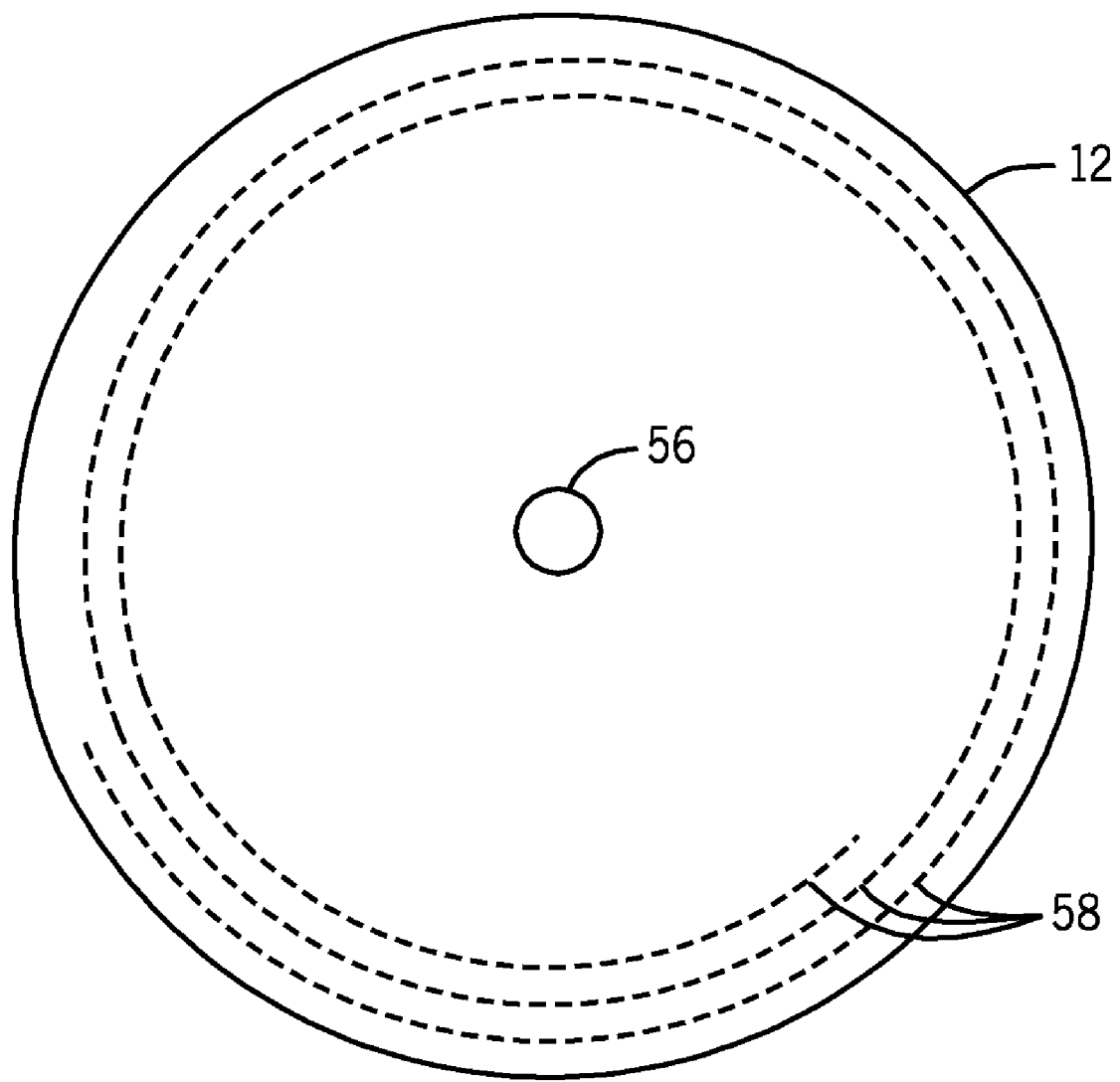
FIG. 2 is a top view of an optical disc in accordance with embodiments of the present technique.

The drive 10 may be used to read an optical data disc 12 containing data as shown in FIG. 2. Generally, the optical data disc 12 is a flat, round disc with one or more data storage material layers embedded in a transparent protective coating. The protective coating may be a transparent plastic, such as polycarbonate, polyacrylate, and the like. Each of the data storage material layers may include any number of data layers that may reflect light. In micro-holographic data storage, a data layer includes micro-holograms. A spindle hole 56 couples to the spindle (e.g., the spindle 36 of FIG. 1) which controls the rotation speed of the disc 12. In each layer, the data may be generally written in a sequential spiraling track 58 from the outer edge of the disc 12 to an inner limit, although circular tracks, or other configurations, may be used.

Injection moldable thermo-plastic based disc materials may be utilized in discs for micro-holographic data storage. Similar to conventional CD/DVD, the disc may spin relatively fast in the optical media player at hundreds or thousands of revolutions per minute (rpm) in a real-time recording and readout system. Vibration and wobble of the disc may be typically up to 100 µm, which is larger than a typical micro-hologram size (e.g., <10 µm). Therefore, tracks on the disc may be employed to enable real-time tracking and focusing. The present technique is directed to a disc structure with embedded tracks for real-time recording and readout. In general, threshold response is desirable from the materials for multi-layer micro-holographic storage. Threshold materials may include dye-doped thermo-plastics, block-copolymers, energy transfer material, and so on. For a discussion of threshold materials of bit-wise holographic data storage, see U.S. Pat. No. 7,388,695, incorporated herein by reference in its entirety.

Figure 3:
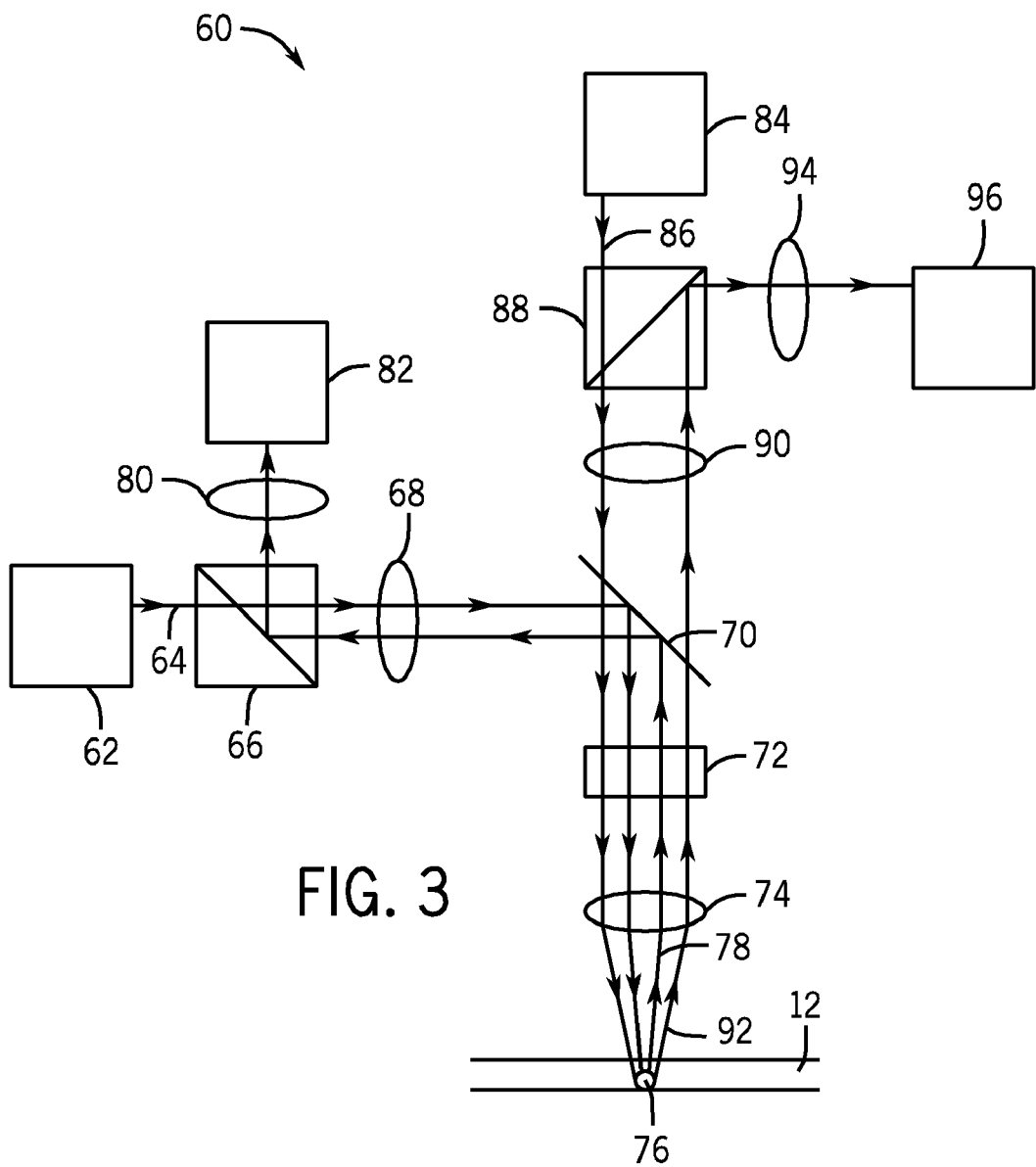
FIG. 3 is a schematic of a detection head in accordance with embodiments of the present technique.
Figure 3A:
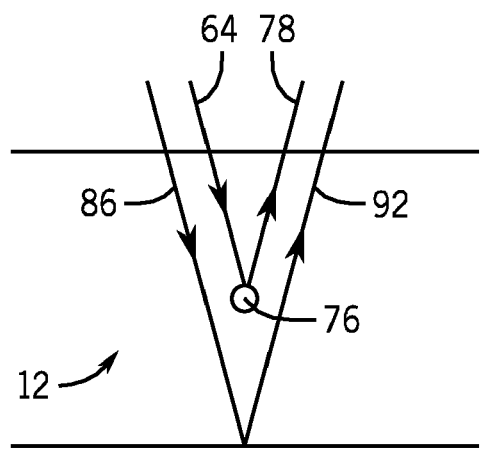

FIGS. 3 and 3A depict an exemplary dual-beam detection head system 60. A light source 62 emits a read beam 64 at a first wavelength which passes through a polarizing beam splitter 66 and depth selecting optics 68. The read beam 64 is reflected off a dichroic mirror 70 and directed through the quarter wave plate 72 and the lens 74 to a micro-hologram 76 in the disc 12. The reflected data beam 78 from the micro-hologram 76 is passed back through the lens 78, quarter wave plate 72, dichroic mirror 70, and depth selecting optics 68. The reflected beam 78 is then passed through the polarizing beam splitter 66, collecting optics 80 and detector 82 where the data of the micro-hologram 76 is read.

Further, a light source 84 emits a tracking beam 86 at a second wavelength which passes through a beam splitter 88 and depth selecting optics 90. The tracking beam 86 passes through the dichroic mirror 70, quarter wave plate 72, and the lens 74 to the disc 12. In the illustrated embodiment, the tracking beam 86 reflects off the disc 12 (e.g., near or at the bottom the disc), which may have a reflective layer, tracks, grooves, and the like. The reflected tracking beam 92 passes through the lens 74, quarter wave plate 72, dichroic mirror 70, collecting optics 90, beam splitter 88, and collecting optics 94 to a detector 96.

Again, in a micro-holographic system, the bit size is typically less than a micron. However, during real-time recording or readout, the disc has significant vibration and wobble, typically up to 100 μm. As the disc vibrates/wobbles by such a distance, the beam condition in the disc changes significantly and thus can't perform proper record and readout. The present technique may use a disc design with tracks embedded so that combined with an appropriate optical system, focusing and tracking can be performed and multi-layer micro-hologram record/read may be achieved in real-time.

Figure 4:
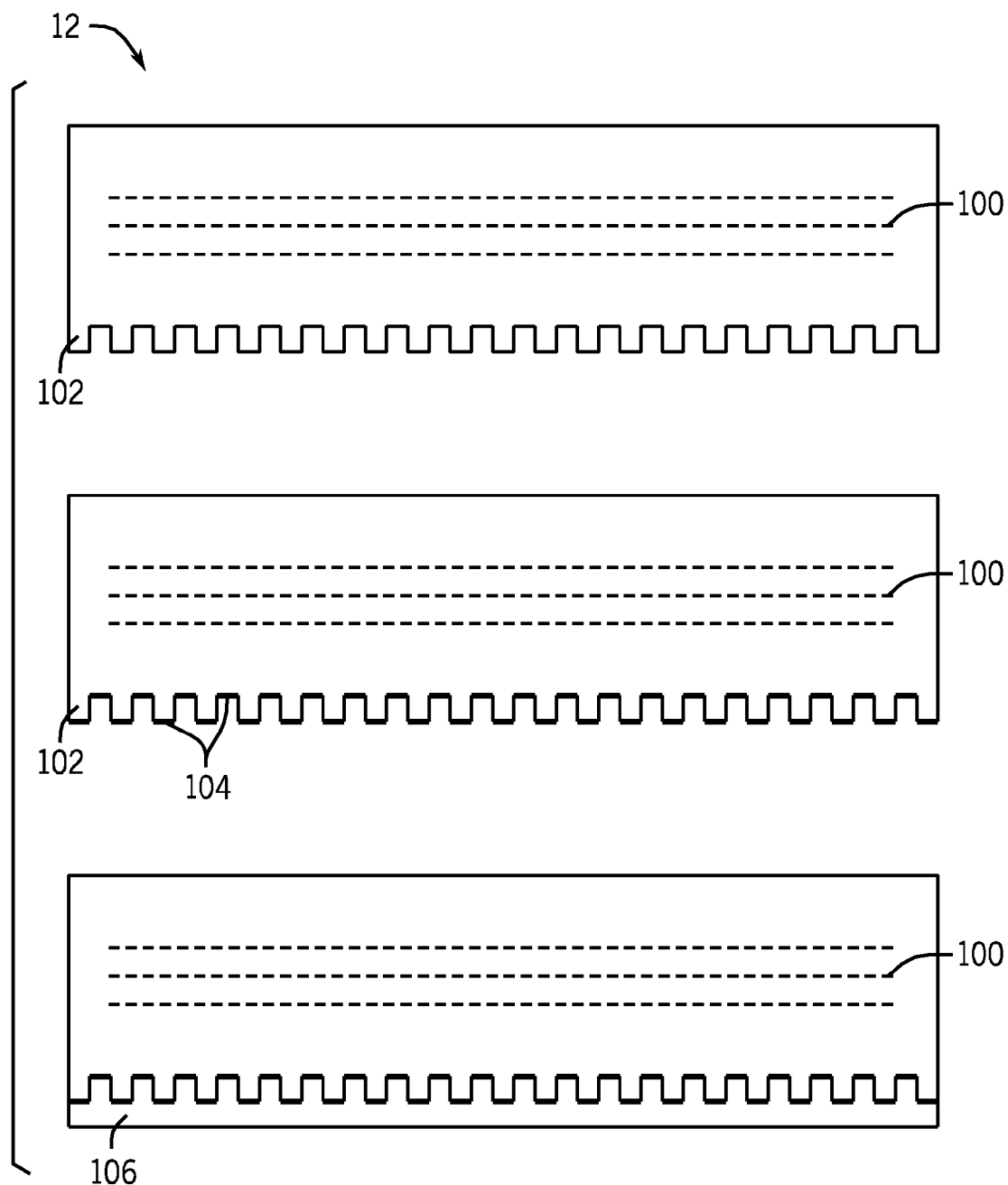
FIG. 4 is a diagrammatical representation of a cross-section of layers of an optical disc in accordance with embodiments of the present technique.

FIG. 4 depicts layers of the optical disc 12 of FIG. 2. The optical disc 12 may be monolithic and have data layers 100 in an optically-enabled or holographic-enabled moldable thermoplastic material. In one embodiment, the disc 12 is injection molded. Tracks or guide grooves 102 may be directly stamped or molded on the disc 12 as part of the monolithic structure. The tracks 102 may be used to guide tracking and focusing. The tracks may be similar to CD-R, DVD-R, DVD+R grooves and configured for a 780 nm or 650 nm track wavelength, for example. The tracks 102 may have various track pitches, spiral grooves, different shapes (e.g., trapezoidal), wobble structures, synchronization marks, and so on.

In certain embodiments, a coating 104, such as a standard dichroic coating, is disposed on the tracks 102. The coating 104 may enhance the reflection of the servo beam from the grooves to provide an enhanced servo (tracking and focusing) signals. The coating 104 is configured generally to have reduced or no impact (of the grooves on the record and readout beams, which are at a different wavelength than the tracking beam. The coating 104 may even enhance transmission of the record and readout beams. The coating 104 may include layers of inorganic material, such as titanium dioxide, silica dioxide, nitrides, and so forth. The coating 104 may be deposited on the grooves 102 by vapor deposition, evaporation, or sputtering methods, and the like.

A second coating 106 may be placed on the groove side on top of the dichroic coating 104. The coating 106 may reduce the wavefront distortion/diffraction impact by the tracks 102 on the recording/readout beam. The coating 106 may be planarized and act as a protection layer. Exemplary materials for the coating 106 may include ultraviolet (UV) curable acrylate (e.g., spot-on and UV cured), and the like, and may have the same or similar refractive index as the recordable material.

FIG. 5 is an exemplary method 120 for manufacturing a holographic disc 12 having multiple data layers 100. The base optically-enabled and/or holographic-enabled thermoplastic material may be molded (e.g., injection molded) into the form of the disc 12 (block 122). The thermoplastic may have a phase change material to accommodate the recording of micro-holograms. The thermoplastic may be a dye-doped thermoplastic material. In certain embodiments, the disc 12 structure may be similar to conventional CD/DVD disc, and therefore, may be fabricated using facilities similar to that for CD/DVD/Blu-ray discs, for example. Further, guide grooves or tracks 102 may be molded with the thermoplastic material onto the disc 12 using a stamper with the appropriate groove structures. In certain instances, the grooves may be molded together with the disc in one step instead of two or more steps. It should be noted that holographic-enabled material in the present context may be defined as optically-enabled material configured to store holographic data or micro-holograms.

The tracks 102 are configured to receive a tracking beam to accommodate undesirable displacement (wobble, axial runout, etc) of a spinning disc 12 in an optical media player. Also, with one layer of tracks 102, multi-layers of data can be recorded and readout with a proper optical design. In general, the tracking beam wavelength may be different from the record/read beam wavelength. Groove structures may be modified when the tracking wavelength is changed. A similar structure may be used for discs of different material, such as dye-doped thermo-plastic discs, block-copolymer discs, and the like.

A reflective coating 104 (reflective to the wavelength of a tracking beam), such as a dichroic coating, may be deposited on the grooves 102 (block 124). As mentioned, the coating 104 may be applied to the grooves and tracks 102 by vapor deposition, for example. The coating 104 may be a multi-layer dielectric having alternating layers of different dielectric materials. The coating 104 may be configured to transmit the record/read beam wavelengths (e.g., 405 nm) and to reflect the tracking beam wavelength (e.g., 780 nm or 650 nm). In addition, a second coating 106 (e.g., acrylate) may be applied to the tracks 102 having the reflective coating 104 to cover the grooves (block 126). The second coating 106 may be planarized and configured to reduce disturbance to the read beam or record beam. In all, the disc 12 may be a substantially monolithic structure.

In general, the disc 12 parameters, which include disc thickness, disc size, track features, track location, coating features, cover layers, additional protection layers, and so forth, can be modified to accommodate different record/read wavelength and tracking wavelength as well as other practical disc fabrication and optical design concerns. The disc 12 may include both the tracks for tracking/focusing and the disc layer structure. An associated optical system design may achieve multi-layer storage using a single layer of tracks. Real-time, multi-layer, multi-track, micro-holographic storage through the volume of the disc 12 may be achieved. For a discussion of optically-enabled materials and manufacturing of holographic data storage discs, see U.S. Pat. No. 7,388,695, incorporated herein by reference in its entirety.

FIG. 6 is a method 140 for tracking control 142 and reading 144 of a holographic storage disc 12 in an optical drive. A tracking or servo beam is impinged on guide grooves in the disc 12 (block 146). The servo beam is reflected, detected, and analyzed (block 148). Analysis of the reflected tracking beam provides feedback to an actuator in the optical drive, for example, and adjusts the position of optical elements to maintain a data beam well-focused on the data track (block 150). A data laser beam having a different wavelength than the servo beam is impinged on multiple micro-holograms in a data track in a data layer of the disc 12 (block 152). The data beam is reflected and the reflected data beam (or signal beam) is detected (block 154) to read the data (e.g., to read the presence or absence of a bit).

Figure 7:
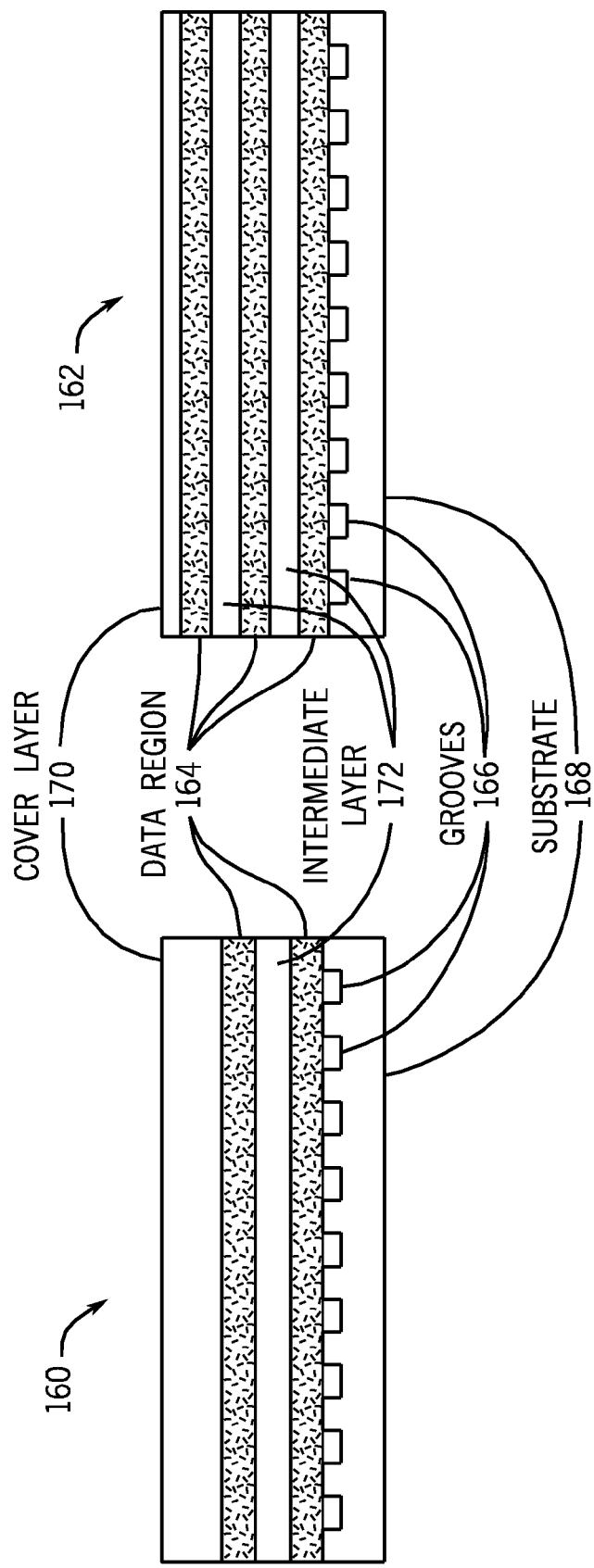
FIG. 7 is a diagrammatical representation of a cross-section of optical discs having multiple data regions in accordance with embodiments of the present technique.

FIG. 7 depicts cross-sections of two optical discs 160 and 162 (e.g., about 1.2 mm total thickness) having multiple data regions 164. In the illustrated embodiment, the first optical disc 160 has two data regions 164 and the second optical disc 162 has three data regions 164. Each data region 164 (e.g., layer greater than 50 μm) may have multiple layers of micro-holograms (e.g., about 1 μm). Guide grooves 166 into the substrate 168 are provided for tracking. In this example, a cover layer 170 (e.g., a planarized protective cover layer) is disposed opposite the substrate 168. Components or layers of the discs may be molded together, bonded together, deposited, or spin-coated, and the like. Bonding may include use of pressure sensitive adhesives, Ultraviolet (UV) curable adhesives, and so forth. Lastly, it should be noted that more than one set of grooves 166 may be incorporated into the discs 160 and 162. For example, each data region 164 may be associated with a respective set of grooves 164.

Figure 8:
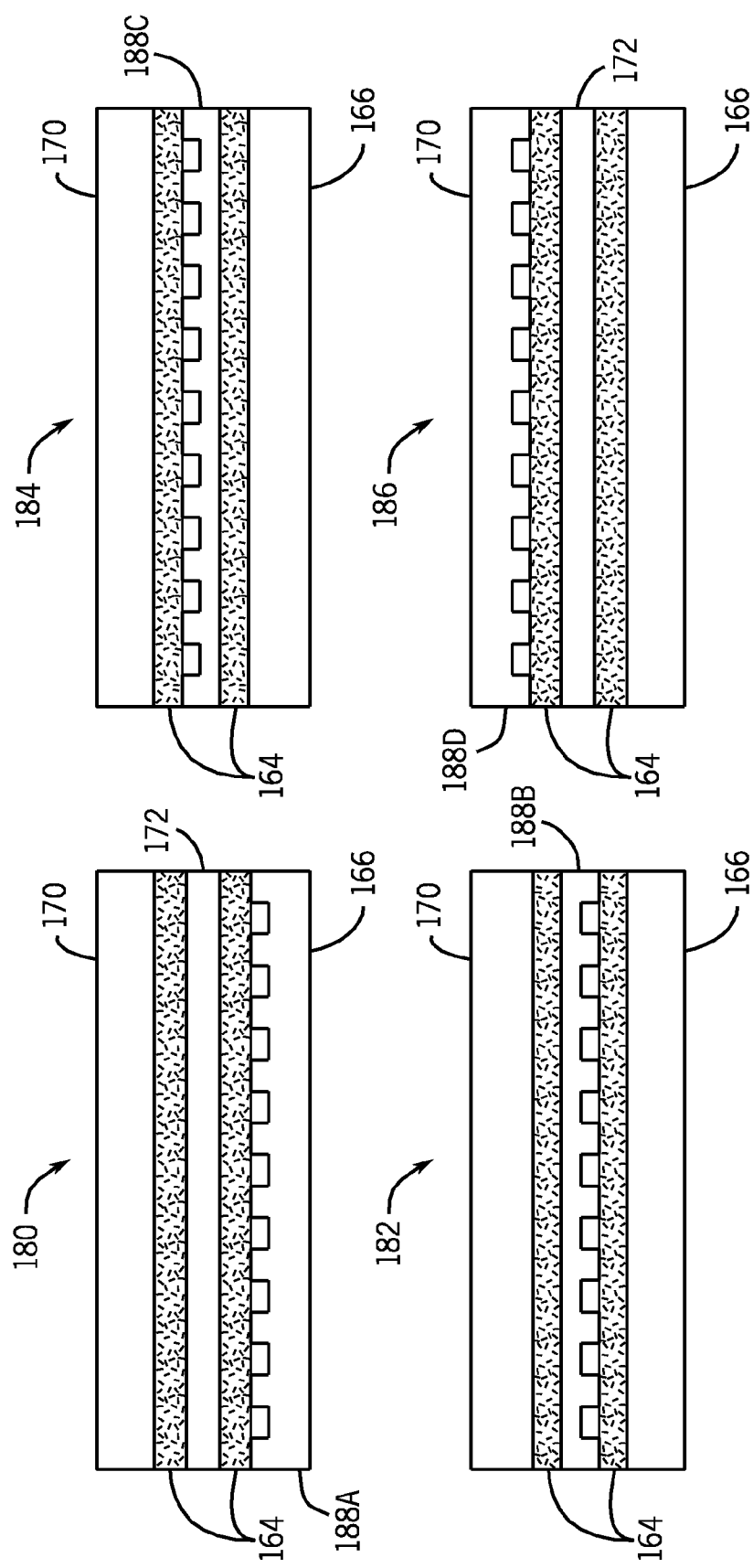
FIG. 8 is a diagrammatical representation of cross-section of optical discs with grooves disposed at different locations in accordance with embodiments of the present technique.
Figure 9:
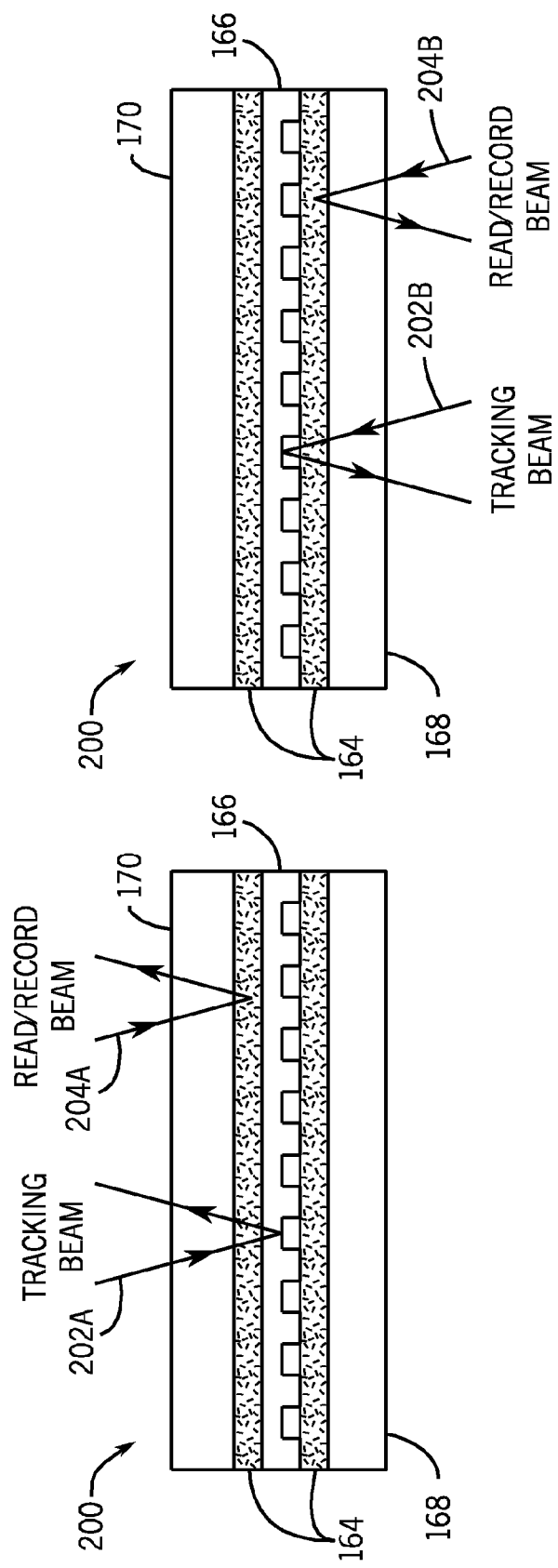
FIG. 9 is a diagrammatical representation of cross-section of an optical disc receiving laser beams from different directions.

FIG. 8 is a diagrammatical representation depicts cross-sections of four optical discs 180, 182, 184, and 186 with tacking grooves 188A, 188B, 188C, and 188D disposed at different locations within the discs including relative to other components of the discs. Further, the discs 180, 182, 184, and 186 generally include a substrate 166 and a protective layer 170. Also, depending on the arrangement and number of the data regions 164, and on the positioning of the grooves 188A, 188B, 188C, and 188D, for example, the discs 180, 182, 184, and 186 may incorporate intermediate regions or layers 172 between the data regions 164. FIG. 9 depicts cross-section of an optical disc 200 receiving laser beams from different directions. The optical disc 200 may receive a tracking beam 202A and/or read/record beam 204A through the protective layer 170. On the other hand, the optical disc 200 may receive a tracking beam 202B and read/record beam 204B through the substrate 168, for example.

In summary, the present technique may be directed to an optical disc for micro-holographic data storage. The disc may include optically-enabled material configured to store holographic data and guide grooves. The disc may have a first coating disposed on the guide grooves and configured to reflect a tracking beam and to transmit a read or record beam, and a second coating disposed to cover the guide grooves and disposed on the first coating. In certain embodiments, the disc may be largely monolithic. The optically-enabled material may have data layers of micro-holograms. The optically-enabled material may include a threshold material (e.g., a phase-change material, a energy transfer material, a thermochromic material, etc.) that is optically-enabled. The guide grooves may be molded as part of the optically-enabled material, and may include spiral tracks, wobble structures, or synchronization marks, or any combination thereof.

The disc may be manufacture as a holographic data storage disc. The disc may be molded (e.g., injection-molded) of holographic-enabled material in a disc shape with guide grooves. A first coating may be applied to the guide grooves, wherein the first coating is configured to reflect a tracking beam and to transmit a read or record beam. Applying the first coating may include depositing, evaporating, or sputtering a coating (e.g., dichroic coating) on the guide grooves, or any combination thereof. A second coating may be disposed (e.g., spin-coated) on the first coating to cover the guide grooves, wherein the second coating is dispose on the first coating.

In another example, a multi-layer optical disc for micro-holographic data storage, includes a substrate layer, at least one layer of optically-enabled material (e.g., thickness of about 0.1 mm to about 1.2 mm thick), and guide grooves. A coating disposed on the guide grooves and configured to reflect a tracking beam and to transmit a read or read beam. The disc may also have a cover layer (e.g., acrylate). Further the disc may have an intermediate layer (e.g., not active) disposed between other layers of the disc, such as between two layers of optically-enabled material. Lastly, the guide groves may be disposed at different locations. For example, the guide grooves may disposed adjacent the substrate layer, the cover layer, or between layers of optically-enabled material, and so on.

A technique of recording, reading, and tracking a holographic data storage disc, includes: impinging a record beam on the holographic data storage disc to store or read a micro-hologram in a data region of the holographic data storage disc, wherein a width of the data region is at least 50 micrometers (μm); impinging and reflecting a tracking beam on a guide groove of the holographic data storage disc, wherein the tracking beam comprises a different wavelength than the record beam and read beam; and detecting and analyzing the reflected tracking beam to control a position of the record beam or read beam on the holographic data storage disc.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical disc for micro-holographic data storage, comprising:
   optically-enabled material configured to store holographic data, wherein the optically-enabled material comprises guide grooves;
   a first coating disposed on the guide grooves and configured to reflect a tracking beam and to transmit a read or record beam; and
   a second coating disposed to cover the guide grooves and disposed on the first coating.

2. The disc of claim 1, wherein the optical disc is largely monolithic.

3. The disc of claim 1, wherein the optically-enabled material comprises data layers comprising micro-holograms.

4. The disc of claim 1, wherein the optically-enabled material comprises a thermoplastic.

5. The disc of claim 1, wherein the optically-enable material comprises a threshold material that is optically-enabled.

6. The disc of claim 5, wherein the threshold material comprises a phase change material, an energy transfer material, or a thermo-chromic material, or any combination thereof.

7. The disc of claim 1, wherein the guide grooves are molded as part of the optically-enabled material.

8. The disc of claim 1, wherein the guide grooves comprise spiral tracks, wobble structures, or synchronization marks, or any combination thereof.

9. The disc of claim 1, wherein the first coating comprises a dichroic coating.

10. The disc of claim 1, wherein the second coating is substantially planarized.

11. The disc of claim 1, wherein the second coating comprises an acrylate.

12. The disc of claim 1, wherein the second coating reduces disturbance by the grooves to a record/read beam.

13. The disc of claim 1, wherein the second coating provides a protective layer for the disc.

14. A method of manufacturing a holographic data storage disc, comprising:

molding a holographic-enabled material in a disc shape with guide grooves;

applying a first coating to the guide grooves, wherein the first coating is configured to reflect a tracking beam and to transmit a read or record beam; and applying a second coating to cover the guide grooves, wherein the second coating is disposed on the first coating.

15. The method of claim 14, wherein molding comprises injection-molding.

16. The method of claim 14, wherein applying the first coating comprises depositing, evaporating, or sputtering a dichroic coating on the guide grooves, or any combination thereof.

17. The method of claim 14, wherein applying the second coating comprises spin coating.

18. A multi-layer optical disc for micro-holographic data storage, comprising:

at least one layer of optically-enabled material arranged between a substrate layer and a cover layer, wherein at least one layer of optically-enabled material comprises guide grooves on one side;

a coating disposed on the guide grooves and configured to reflect a tracking beam and to transmit a read or record beam.

19. The disc of claim 18, comprising at least two layers of optically-enabled material, wherein an intermediate layer is disposed between two layers of optically-enabled material.

20. The disc of claim 18, wherein the guide grooves are disposed directly adjacent the substrate layer.

21. The disc of claim 18, wherein the guide grooves are disposed directly adjacent the cover layer.

22. The disc of claim 18, wherein the guide grooves are disposed between two layers of optically-enabled material.

23. The disc of claim 18, wherein the at least one layer of optically- enabled material comprises a thickness in the range of about 0.1 millimeter (mm) to about 1.2 mm.

\* \* \* \* \*